US010671660B2

(12) United States Patent
Chou et al.

(10) Patent No.: US 10,671,660 B2
(45) Date of Patent: Jun. 2, 2020

(54) CONTEXTUAL RANKING OF PHOTOS AND TEXT IN SEARCH

(71) Applicant: Google Inc., Mountain View, CA (US)

(72) Inventors: Timothy Chou, Seal Beach, CA (US); Qichi Yang, Foster City, CA (US); Boris Mazniker, Berkeley, CA (US); Chris Schilling, Santa Clara, CA (US); David Chen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 313 days.

(21) Appl. No.: 15/720,510

(22) Filed: Sep. 29, 2017

(65) Prior Publication Data

US 2018/0181570 A1   Jun. 28, 2018

Related U.S. Application Data

(60) Provisional application No. 62/437,842, filed on Dec. 22, 2016.

(51) Int. Cl.
| G06F 16/51 | (2019.01) |
| G06F 16/54 | (2019.01) |
| G06F 16/958 | (2019.01) |
| G06F 16/9535 | (2019.01) |
| G06F 16/2457 | (2019.01) |
| G06F 16/583 | (2019.01) |

(52) U.S. Cl.
CPC ........ *G06F 16/51* (2019.01); *G06F 16/24578* (2019.01); *G06F 16/54* (2019.01); *G06F 16/583* (2019.01); *G06F 16/958* (2019.01); *G06F 16/9535* (2019.01)

(58) Field of Classification Search
CPC ........ G06F 16/51; G06F 16/958; G06F 16/54; G06F 16/9535; G06F 16/24578; G06F 16/583
USPC .......................................................... 707/723
See application file for complete search history.

(56) References Cited

U.S. PATENT DOCUMENTS

| 8,463,774 | B1 * | 6/2013 | Buron | G06F 16/95 707/724 |
| 9,146,939 | B1 * | 9/2015 | Zhdanovich | G06F 16/532 |
| 2007/0198495 | A1 * | 8/2007 | Buron | G06F 16/9537 |
| 2008/0154888 | A1 * | 6/2008 | Buron | G06F 16/9537 |
| 2009/0132511 | A1 * | 5/2009 | Yang | G06F 16/9537 |
| 2011/0302162 | A1 * | 12/2011 | Xiao | G06F 16/29 707/724 |

(Continued)

*Primary Examiner* — Evan Aspinwall
(74) *Attorney, Agent, or Firm* — Lerner, David, Littenberg, Krumholz & Mentlik, LLP

(57) ABSTRACT

Aspects of the disclosure relate to determining relevant content in response to a request for information. One or more computing devices may receive a query requesting information regarding a place of interest and identify a first place which satisfies the query associated with a first database and a set of displayable content associated with the first place within a second database. The one or more computing devices may identify a subset of the displayable content for display in response to the query, the identification of the subset of displayable content comprising determining a ranking for each item of displayable content in the set of displayable content according to the query. The subset of displayable content and the first place may be provided for presentation on a client device.

14 Claims, 7 Drawing Sheets

(56) References Cited

U.S. PATENT DOCUMENTS

| | | | |
|---|---|---|---|
| 2012/0166432 A1* | 6/2012 | Tseng | G06Q 30/0261 707/728 |
| 2013/0246381 A1* | 9/2013 | Garg | G06F 16/9537 707/706 |
| 2015/0161271 A1* | 6/2015 | Gur | G06F 16/9537 707/728 |
| 2017/0097933 A1* | 4/2017 | Rajan | G06F 16/24578 |

* cited by examiner

CONTEXTUAL RANKING OF PHOTOS AND TEXT IN SEARCH

CROSS-REFERENCE TO RELATED APPLICATION

This application claims the benefit of the filing date of U.S. Provisional Patent Application No. 62/437,842, filed Dec. 22, 2016, the disclosure of which is hereby incorporated herein by reference.

BACKGROUND

The internet presence of public and private locations, such as restaurants, hotels, and parks is continuing to increase. Along with the increased internet presence, information such as imagery and other content corresponding to these locations is also increasing. Determining which information regarding these locations is relevant to a particular user in response to a user query becomes increasingly difficult as the volume of data continues to increase.

Embodiments within the disclosure relate generally to determining content in response to a request. One aspect includes a method for determining relevant content in response to a request for information. One or more computing devices may receive a query requesting information regarding a place of interest and identify a first place which satisfies the query associated with a first database and a set of displayable content associated with the first place within a second database. The one or more computing devices may identify a subset of the displayable content for display in response to the query, the identification of the subset of displayable content comprising determining a ranking for each item of displayable content in the set of displayable content according to the query. The subset of displayable content and the first place may be provided for presentation on a client device.

In some embodiments identifying the first place includes identifying particular attributes within the query. For each place in a set of places, one or more place attributes may be determined and assigned a relevance score based on the one or more place attributes and the particular attributes. The place with the highest assigned relevance score may be selected as the first place.

In some embodiments determining the ranking for each item of displayable content in the set of displayable content may include identifying particular attributes within the query. For each item of displayable content in the set of displayable content, one or more place attributes may be associated and a relevance score based on the one or more place attributes and the particular attributes may be assigned.

In some embodiments identifying the subset of the displayable content may include selecting one or more items of displayable content in the set of displayable content which are assigned the highest relevance scores. In some embodiments one or more additional places are identified which satisfies the query within a first database and additional sets of displayable content associated with each of the one or more additional places within a second database. Additional subsets of the additional sets of displayable content may be identified for display in response to the query, the identification of the additional subsets of displayable content comprising determining a ranking for each item of displayable content in the additional sets of displayable content based on the query. The additional subset of displayable content and the one or more additional places may be provided.

In some embodiments identifying the ranking for each item of displayable content in the set of displayable content is weighted according to the one or more associated place attributes.

In some embodiments the displayable content includes one or more of webpage addresses, contact information, business information, reviews, ratings, images, and social media accounts.

Another aspect includes a system for determining relevant content in response to a request for information. The system may include one or more computing devices and memory storing instructions, the instructions executable by the one or more computing devices. The instructions may include receiving a query requesting information regarding a place of interest; identifying a first place which satisfies the query associated with a first database and a set of displayable content associated with the first place within a second database; identifying a subset of the displayable content for display in response to the query, the identification of the subset of displayable content comprising determining a ranking for each item of displayable content in the set of displayable content according to the query; and providing the subset of displayable content and the first place for presentation on a client device.

Another aspect includes a non-transitory computer readable medium on which instructions are stored, the instructions when executed by one or more processors, cause the one or more processors to perform the steps of receiving a query requesting information regarding a place of interest; identifying a first place which satisfies the query associated with a first database and a set of displayable content associated with the first place within a second database; identifying a subset of the displayable content for display in response to the query, the identification of the subset of displayable content comprising determining a ranking for each item of displayable content in the set of displayable content according to the query; and providing the subset of displayable content and the first place for presentation on a client device.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

Figure 1:
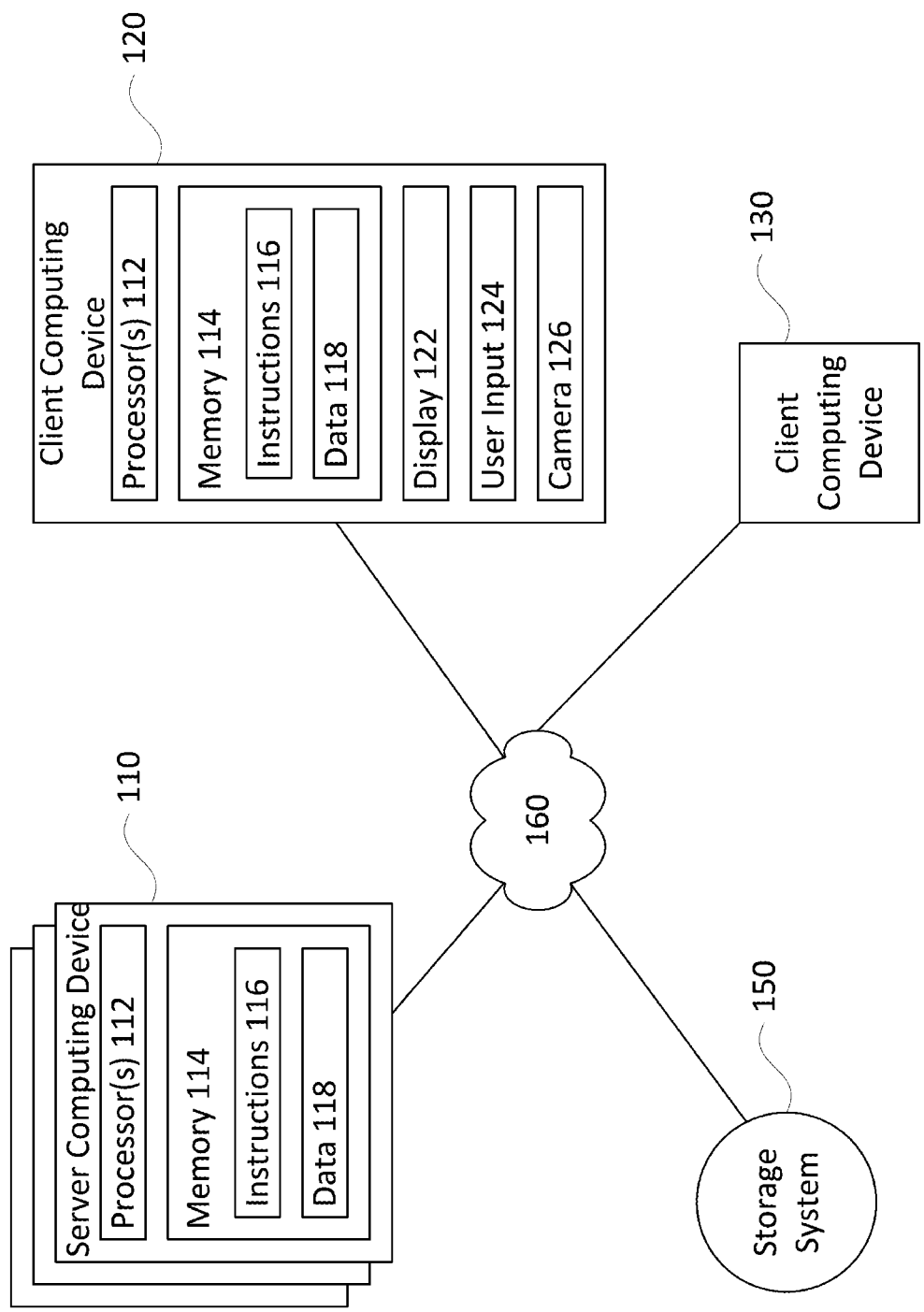
FIG. 1 is a functional diagram of an example system in accordance with aspects of the disclosure.

The technology relates to ranking photos and text based on specific attributes of a place of interest. In particular, the ranking applies to receiving a user query for a place, such as a place of business, and ranking displayable content related to that place based on the query. In this regard, machine learning infrastructure may be used to associate attributes to a set of displayable content of the place, such as images or reviews. The attributes may then be used to rank the set of displayable content of the place in relation to the query.

One or more classifiers may be trained through the machine learning infrastructure to associate attributes to a place. Annotations from text based information related to a place may be input into the machine learning infrastructure to create associations between the place and attributes detected in the input information.

Features of the displayable content may also be associated with the place attributes of the place by the machine learning infrastructure. For instance, the classifier(s) may identify features in the images, such as a patio and a high-chair, as being related to one or more place attributes of "outdoor seating" and "kid-friendly," respectively. The place attributes of "outdoor seating" and "kid-friendly" may then be associated with the images.

According to one aspect, input received from a user, such as a search query, may be parsed to identify particular attributes within the received input. For instance, a text query may be parsed to identify one or more particular attributes contained in the words or phrases in the text query.

A name of a place may be retrieved based on its relevance to the particular attributes in the received input. The relevance may be a relevance score calculated by determining, for each place, a level of correlation between the place attributes and the particular attributes of the received input. The level of correlation between place attributes and the identified particular attributes may have a greater weight than a correlation between place attributes and only some of the identified particular attributes. The name of the place with the highest relevance score may be retrieved and displayed in a list of search results or elsewhere, such as on an information page.

A set of displayable content related to the retrieved place may be retrieved from a database. The retrieved displayable content associated with a retrieved place may be based on particular attributes ranked to determine which displayable content of the set of displayable content should be displayed in association with the place. The set of displayable content may be ranked based on at least one of the particular attributes in the received input and the attributes associated with each respective piece of displayable content. Specifically, displayable content of the same type, such as images, may be ranked against one another based on a relevance score.

The relevance score may be calculated by using an impact implementation, a dot product, and/or normalization for each type of displayable content. For example, for visual content, such as an image, the level of confidence of an associated place attribute may be multiplied by a predetermined weighting factor for that particular place attribute to provide a relevance score. In the case of textual displayable content, such as reviews, the number of times an associated place attribute is mentioned may be multiplied by a predetermined weighting factor for that type of attribute to provide a relevance score.

The relevance score may additionally or alternatively be determined by calculating the dot product between each level of confidence of an associated place attribute and the predetermined weight factors for each particular place attribute of the place. Additionally, or alternatively, the relevance score may be determined by averaging the dot products. The normalized dot products may be averaged together to determine a relevance score.

The displayable content having the top ranking may then be prepared for presentation on a display device to a user. In this regard, the displayable content may be displayed in a place page in association with the retrieved place, such as in a thumbnail. Other displayable content associated may also be present. Additionally or alternatively, the above features may be used to rank and display a plurality of reviews of the place or a set of ranked lists associated with the place. Ranked lists may be lists compiled based on an identified attribute.

The features allow for returning relevant content to a user query. The returns may be based on the contents of the user query, therefore the retrieved information may be more relevant to the user sending the query. The features also allow for a user to more easily and quickly access and find information relevant to what in the user query. As the content is pre-associated with certain terminology, the processing speed of the system may be improved, as the system does not need to associate the content with terminology at the time of the search. Because more relevant information is retrieved, a user is more likely to return to use the system.

Example Systems

Figure 2:
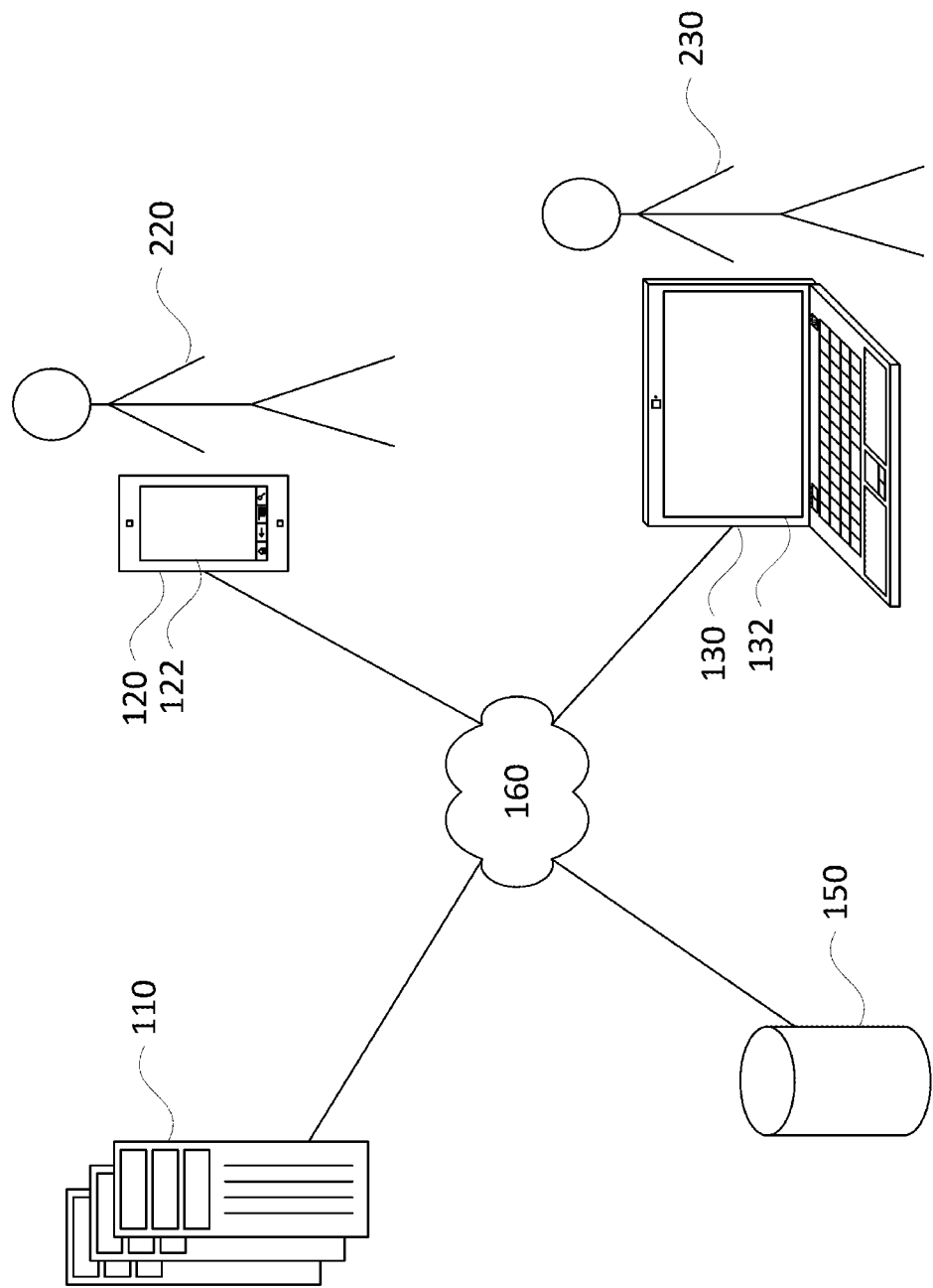
FIG. 2 is a pictorial diagram of the example system of FIG. 1.

FIGS. 1 and 2 illustrate an example system 100 in which the features described above may be implemented. It should not be considered as limiting the scope of the disclosure or usefulness of the features described herein. In this example, system 100 can include computing devices 110, 120, and 130 as well as storage system 150. Each computing device can contain one or more processors 112, memory 114 and other components typically present in general purpose computing devices. Memory 114 of each of computing devices 110, 120, and 130 can store information accessible by the one or more processors 112, including instructions 116 that can be executed by the one or more processors 112.

The memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110, 120, and 130 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of the computing devices as being within the same block, the processor(s), computer, computing device, or memory can actually comprise multiple processors, computers, computing devices, or memories that may or may not be stored within the same physical housing. For example, the memory 144 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, and 130 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120 and 130 via the network. For example, one or more of server computing devices 110 may use network 160 to transmit and present information to a user, such as user 220 or 230, on a display, such as displays 122 or 132 of computing devices 120 or 130. In this regard, computing devices 120 and 130 may be considered client computing devices, and may perform all or some of the features described herein.

Each of the client computing devices 120 and 130 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122 or 132 (e.g., a monitor having a screen, a touch-screen, a projector, a television, or other device that is operable to display information), and user input device 124 (e.g., a mouse, keyboard, touch-screen, or microphone). The client computing device may also include a camera 126 for recording video streams and/or capturing images, as well as speakers, a network interface device, and all of the components used for connecting these elements to one another (not shown).

Although the client computing devices 120 and 130 may each comprise a full-sized personal computing device, they may alternatively comprise mobile computing devices capable of wirelessly exchanging data with a server, such as server computing device 110, over a network such as the Internet. By way of example only, client computing device 120 may be a mobile phone or a device such as a wireless-enabled PDA, a tablet PC, wearable device or a netbook that is capable of obtaining information via the Internet. In another example, client computing device 130 may be a tablet or laptop computer. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, and 130 (not shown).

Memory 114 and storage system 150 may include one or more databases. In one example, the memory 114 may include a plurality of databases storing data relating to one or more places. For example, the plurality of databases may include displayable content such as images, webpages, reviews, metadata, and other text based information related to places. Each displayable content may be stored in association with the place it is associated. Other information related to the place, such as place attributes, may also be stored in the storage system 150 or at the servers 110.

Example Methods

Figure 3:
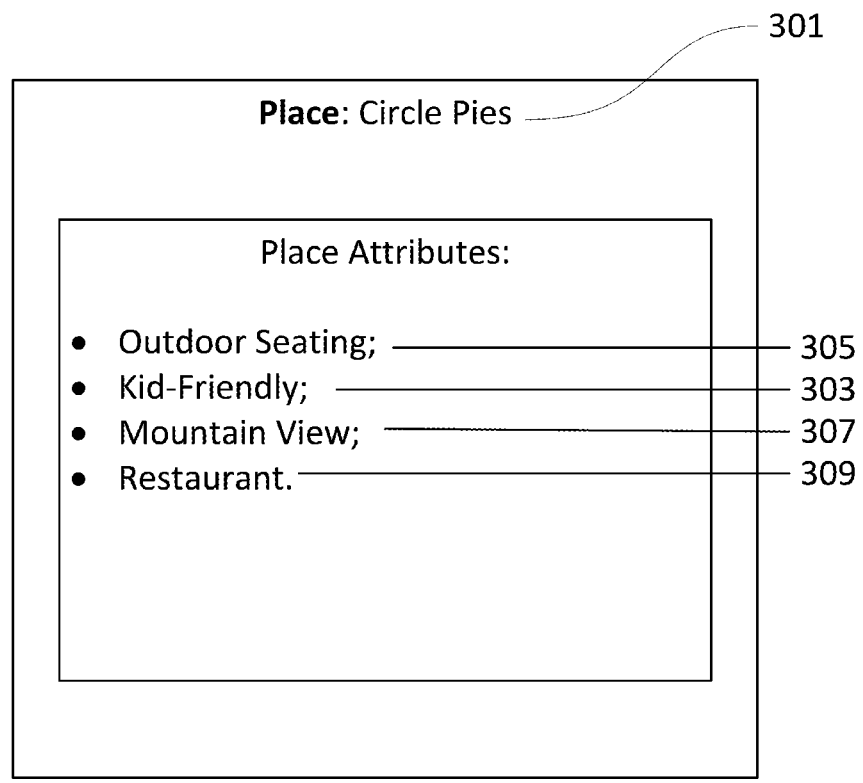
FIG. 3 illustrates a place associated with place attributes in accordance with aspects of the disclosure.

In accordance with aspects of the technology, machine learning infrastructure comprising one or more classifiers may be trained to associate attributes to a place. In this regard, annotations from images, webpages, reviews, metadata, and other text based information related to a place may be input into the machine learning infrastructure, operating on a computing device, such as server 110, to create associations between the place and attributes detected in the input information. Separate classifiers may be used for each attribute. For example, as shown in FIG. 3, a restaurant in Mountain View, Circle Pies 301, may be associated with place attributes such as "outdoor seating" 305, "kid-friendly" 303, "Mountain View" 307 and "Restaurant" 309 based on reviews associated with the restaurant. The place attributes may be stored in a database such as storage system 150. Although the example shows the place as a restaurant, the place may be any place of business or other private or public location, such as a hotel, a club, a tourist destination, etc.

Figure 4:
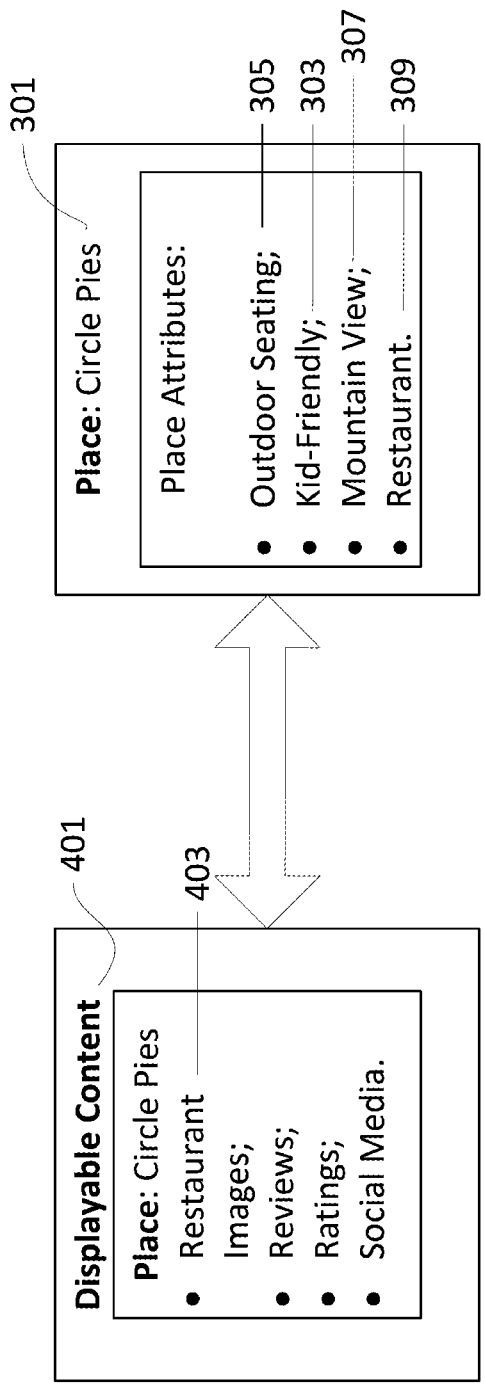
FIG. 4 illustrates displayable content associated with place attributes of a place in accordance with aspects of the disclosure.

The machine learning infrastructure may also be trained to associate the place attributes of the place with features of displayable content associated with the place. Displayable content may include webpage addresses, contact information (e.g., address, phone number, email, etc.), business information (e.g., hours of operation, descriptions, etc.), reviews, ratings, images, social media accounts, and the like. For example, as shown in FIG. 4, displayable content 401 associated with Circle Pies may include one or more images 403 of the restaurant. The one or more classifiers may identify features in the images, such as a patio and a high-chair, as being related to one or more place attributes of "outdoor seating" 305 and "kid-friendly" 303, respectively. The place attributes of "outdoor seating" 305, "kid-friendly" 303, "Mountain View" 307 and "Restaurant" 309 may then be associated to the images. Through this training, the one or more classifiers learn to identify and associate place attributes in displayable content.

The identification of features may be performed using image label technology. In one example of this, techniques which analyze features within an image to assign a place attribute describing the features to the image, such as those that utilize statistical classification methods, may be used to automatically assign place attributes to the image. In some embodiments, a machine learning model may be trained manually by assigning place attributes to features in images relative to a reference taxonomy. The trained machine learning model may then automatically assign place attributes to images in accordance with the reference taxonomy.

Figure 5:
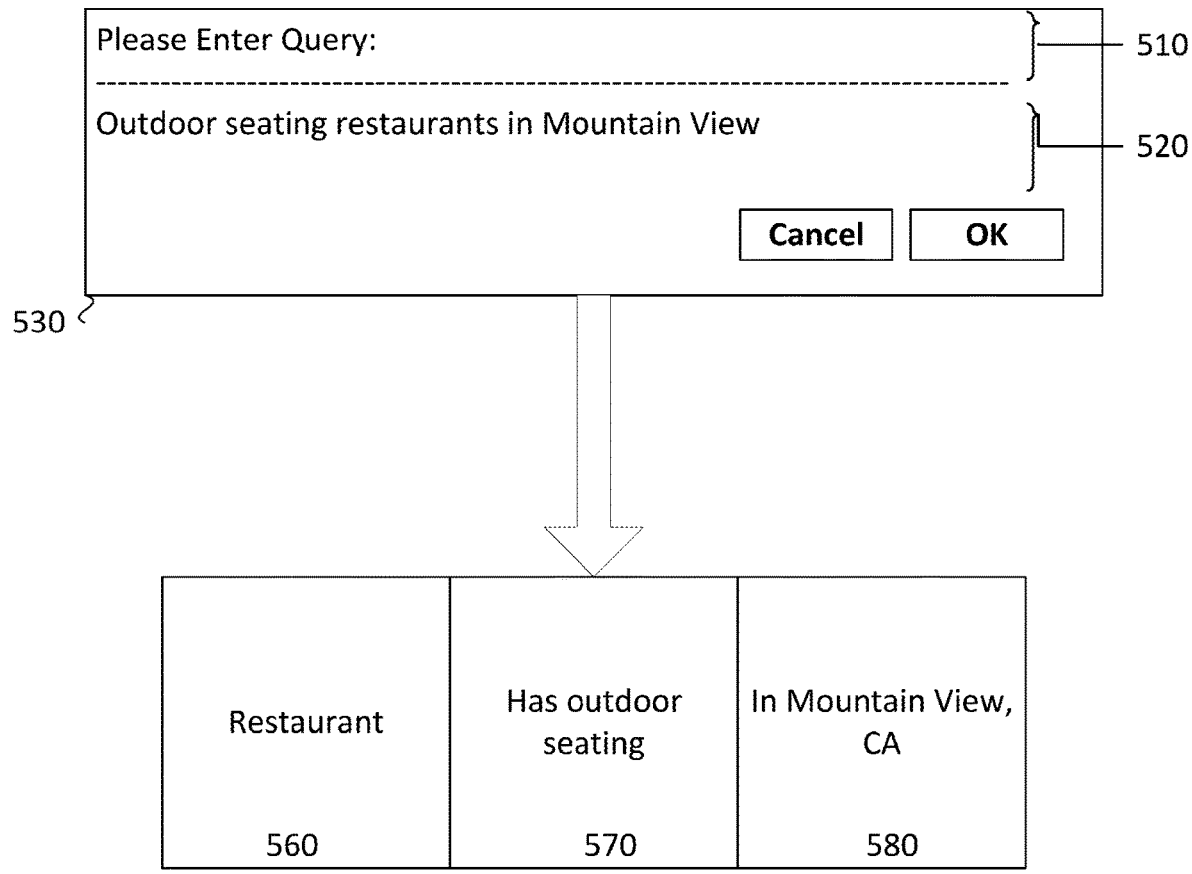
FIG. 5 is an example query box with filled input parsed into particular attributes in accordance with aspects of the disclosure.

Particular attributes may be identified based on input received from a user. Received input from the user may be a text query, a user selection, or other input received by a user. For instance, as shown in FIG. 5, a text query 520 stating "outdoor seating restaurants in Mountain View," may be input by a user into a query box 530 in response to a request for information 510. The text query 520 may be parsed to identify one or more particular attributes such as "restaurant" 560, "has outdoor seating" 570 and "in Mountain View, Calif." 580.

A name of a place may be retrieved based on its relevance to the particular attributes in the received input. The relevance may be a relevance score calculated by determining, for each place, a level of correlation between the place attributes 303-309 and the particular attributes 560-580 of the received input. The name of the place with the highest relevance score may be retrieved and displayed in a list of search results or elsewhere, such as within an application or on a webpage. In some embodiments a relevance score may be determined for a subset of places. More than one place may also be retrieved and displayed. For example, the top ten places containing the highest relevance scores may be displayed.

When determining the level of correlation, a greater weight may be placed on having a correlation between place attributes and all of the identified particular attributes than on a correlation between an place attributes and only some of the identified particular attributes. Continuing the above example, a second restaurant, Square Pies may be associated with place attributes of "Mountain View" and "kid-friendly" while Circle Pies is associated with the place attributes of "Outdoor Seating," 305, "Restaurant" 309, and "Mountain View" 307 and the particular attributes are "restaurant" 560, "has outdoor seating" 570 and "in Mountain View, Calif." 580. As Circle Pies has a strong correlation between three place attributes "Outdoor Seating," 305, "Restaurant" 309, and "Mountain View" 307 with the particular attributes of "restaurant" 560, "has outdoor seating" 570 and "in Mountain View, Calif." 580, instead of Square Pizza's two place attributes, in this example Circle Pies has a higher level of correlation than Square Pies.

In this scenario, displayable content associated with a retrieved place is retrieved based on particular attributes. In this regard, a set of displayable content related to the retrieved place may be retrieved from a database. The set of displayable content related to the retrieved place is ranked to determine which displayable content of the plurality of displayable content should be displayed in association with the place. In some examples, the plurality of content is retrieved after receiving user input selecting the place from a list of search results.

The set of displayable content is ranked based on at least one of the particular attributes in the received input and the attributes associated with each respective piece of displayable content. Specifically, displayable content of the same type, such as images, is ranked against one another based on a relevance score. A relevance score is calculated by identifying attributes associated with the displayable content and determining a level of confidence that the attributes associated with the displayable content match at least one of the particular attributes. Displayable content with the highest level of confidence that the associated attributes correlate to the particular attributes has a high relevance score, and therefore the highest ranking.

Figure 6:
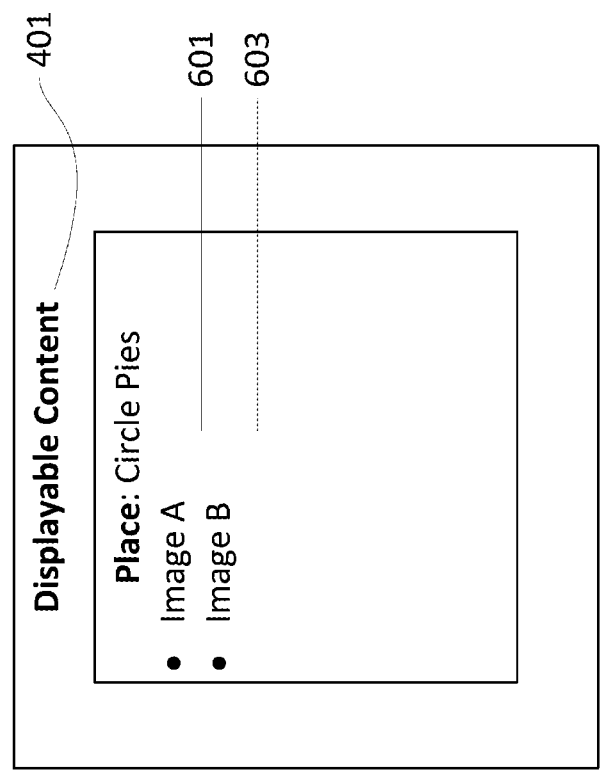
FIG. 6 illustrates example displayable content associated with a place in accordance with aspects of the disclosure.

In an example, displayable content 401 associated with Circle Pies restaurant may include image 'A' 601 and image 'B' 603, as shown in FIG. 6. Here, image 'A' 601 may be associated with place attributes of "restaurant" and "has outdoor seating" and image B' may be associated with the attribute of "restaurant". Continuing with the particular attributes of text query 520, "restaurant" 560, "has outdoor seating" 570 and "in Mountain View, Calif." 580, image 'A' containing both place attributes of "restaurant" and "has outdoor seating" may be assigned a high level of confidence and thus, a high relevance score, while image 'B' containing only the attribute of "restaurant" may have a lower level of confidence and thus, a low relevance score. Since image 'A' has a higher confidence level, image 'A' is ranked higher than image 'B'.

The relevance score may be calculated by using an impact implementation, a dot product, and/or normalization. In this regard, a relevance score may be calculated for each type of displayable content. For example, the impact implementation may be determined for both visual and textual displayable content. For instance, for visual displayable content such image 'A' 601, the level of confidence of an associated place attribute may be multiplied by a predetermined weighting factor for that particular place attribute to provide a relevance score. For example, the level of confidence of the associated place attribute "restaurant" may be multiplied by a predetermined weighting factor of, e.g., 0.8, while associated place attribute "has outdoor seating" may be multiplied by a weighting factor of, e.g., 0.2. In the case of textual displayable content, such as reviews, the number of times an associated place attribute is mentioned may be multiplied by a predetermined weighting factor for that type of attribute to provide a relevance score.

The relevance score may additionally or alternatively be determined by calculating the dot product between each level of confidence of an associated place attribute and the predetermined weight factors for each particular place attribute of the place. Using the dot product accounts for the presence of negative features which lower the ranking of the displayable content. For instance, if an image included a feature of wine, that image may initially be considered to be of a romantic location. However, if the image included the additional feature of a high chair, the image would likely not be considered to be of a romantic location.

The relevance score may be determined by averaging the dot products. In other examples, the level of confidence may be normalized by calculating the dot product for every feature-attribute pair and then dividing the dot products by monotonically increasing functions. The monotonically increasing functions may be a function of the number of identified features in the displayable content.

In other scenarios, the relevance score may be determined by averaging the normalized dot products. Normalization of the dot product may result in levels of confidence that are not as skewed towards displayable content that has a larger number of identified features, such as longer reviews or images with more tags. In some examples, normalization may further include using a threshold value for weights, such that features with weights below the threshold value are removed from the calculation of the level of confidence. Alternatively, the weights for a given displayable content may be normalized so that the average of the weights is 0.

One or more items of the displayable content may be presented for display to a user based on their determined ranking. For example, the displayable content having the top two rankings may be two images 'A' 601 and 'B' 603. These two images may be displayed in a place page in association with the retrieved place. In this regard, the two images may be displayed as thumbnails. In addition to the two images 601 and 603, the place page may display the other displayable content associated with the place, such as the name of the place the ranking, the contact information, the business information, and the reviews.

Additionally or alternatively, the above features may be used to rank and display a plurality of reviews of the place or a plurality of ranked lists associated with the place. Ranked lists may be lists compiled based on an identified attribute. For example, Circle Pies may be associated with ranked lists such as "Top Ten Kid-Friendly Restaurants in Mountain View" and "Top Ten Italian Restaurants in the Bay Area."

Figure 7:
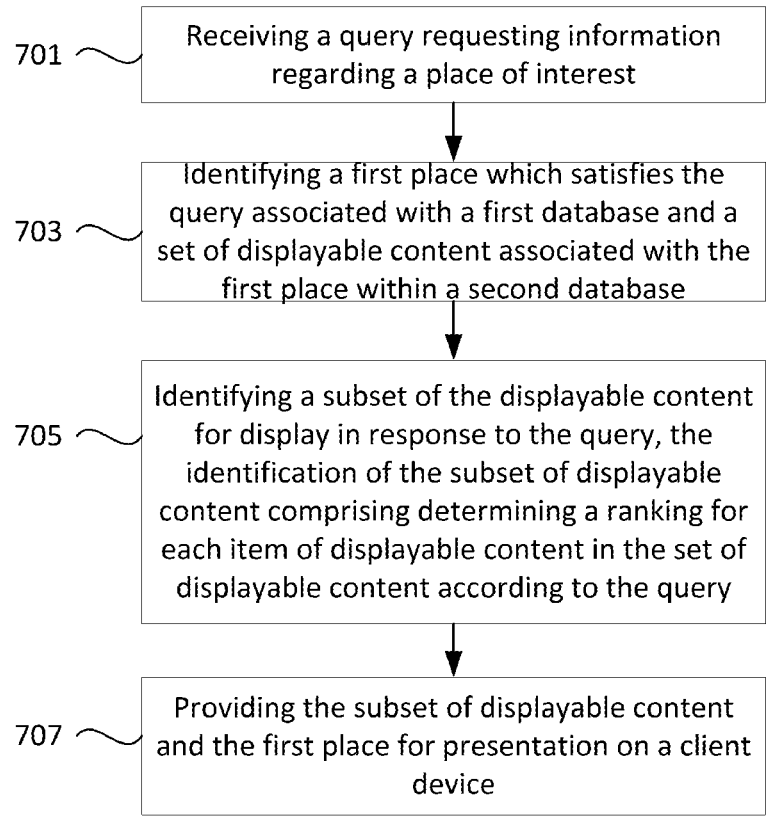
FIG. 7 is a flow chart illustrating aspects of the disclosure.

Flow diagram 700 of FIG. 7 is an example flow diagram of some of the aspects described above that may be performed by one or more computing devices such as client computing devices 120 and 130. In this example, at block 701 a query requesting information is received. A first place which satisfies the query and an associated set of displayable content is identified as shown in block 703, and a subset of the displayable content for display in response to the query is identified as shown in block 705. In this scenario, the identification of the subset of displayable content comprises determining a ranking for each item of displayable content in the set of displayable content. As shown in block 707 the subset of displayable content is selected for display on a display of the client computing device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method for determining relevant content in response to a request for information, the method comprising:
  receiving, by one or more computing devices, a query requesting information regarding a place of interest;
  identifying, by the one or more computing devices, a first place which satisfies the query associated with a first database and a set of displayable content associated with the first place within a second database;
  identifying, by the one or more computing devices, a subset of the displayable content for display in response to the query, the identification of the subset of displayable content comprising determining a ranking for each item of displayable content in the set of displayable content according to the query, wherein determining the ranking for each item of displayable content in the set of displayable content comprises:
    identifying particular attributes within the query,
    determining, for each item of displayable content in the set of displayable content, using a machine learning classifier, one or more place attributes,
    assigning, to each item of displayable content in the set of displayable content, a relevance score based on the one or more place attributes and the particular attributes, and
    selecting one or more items of displayable content in the set of displayable content which are assigned the highest relevance scores to be the subset of displayable content; and
  providing, by the one or more computing devices, the subset of displayable content and the first place for presentation on a client device.

2. The computer implemented method of claim 1, wherein identifying the first place comprises:
  identifying particular attributes within the query;
  for each place in a set of places, determining one or more place attributes and assigning a relevance score based on the one or more place attributes and the particular attributes; and
  selecting a place with the highest assigned relevance score as the first place.

3. The computer implemented method of claim 1, further comprising:
  identifying one or more additional places which satisfies the query within a first database and additional sets of displayable content associated with each of the one or more additional places within a second database;
  identifying additional subsets of the additional sets of displayable content for display in response to the query, the identification of the additional subsets of displayable content comprising determining a ranking for each item of displayable content in the additional sets of displayable content based on the query; and
  providing, by the one or more computing devices, the additional subset of displayable content and the one or more additional places.

4. The computer implemented method of claim 1, wherein the ranking for each item of displayable content in the set of displayable content is weighted according to the one or more associated place attributes.

5. The computer implemented method of claim 1, wherein the displayable content includes one or more of webpage addresses, contact information, business information, reviews, ratings, images, and social media accounts.

6. A system for determining relevant content in response to a request for information comprising:
one or more computing devices; and
memory storing instructions, the instructions executable by the one or more computing devices;
wherein the instructions comprise:
receiving a query requesting information regarding a place of interest;
identifying a first place which satisfies the query associated with a first database and a set of displayable content associated with the first place within a second database;
identifying a subset of the displayable content for display in response to the query, the identification of the subset of displayable content comprising determining a ranking for each item of displayable content in the set of displayable content according to the query wherein determining the ranking for each item of displayable content in the set of displayable content comprises:
identifying particular attributes within the query,
determining, for each item of displayable content in the set of displayable content, using a machine learning classifier, one or more place attributes,
assigning, to each item of displayable content in the set of displayable content, a relevance score based on the one or more place attributes and the particular attributes, and
selecting one or more items of displayable content in the set of displayable content which are assigned the highest relevance scores to be the subset of displayable content; and
providing the subset of displayable content and the first place for presentation on a client device.

7. The system of claim 6, wherein identifying the first place comprises:
identifying particular attributes within the query;
for each place in a set of places, determining one or more place attributes and assigning a relevance score based on the one or more place attributes and the particular attributes; and
selecting a place with the highest assigned relevance score as the first place.

8. The system of claim 6, further comprising:
identifying one or more additional places which satisfies the query within a first database and additional sets of displayable content associated with each of the one or more additional places within a second database;
identifying additional subsets of the additional sets of displayable content for display in response to the query, the identification of the additional subsets of displayable content comprising determining a ranking for each item of displayable content in the additional sets of displayable content based on the query; and
providing the additional subset of displayable content and the one or more additional places.

9. The system of claim 6, wherein the ranking for each item of displayable content in the set of displayable content is weighted according to the one or more associated place attributes.

10. The system of claim 6, wherein the displayable content includes one or more of webpage addresses, contact information, business information, reviews, ratings, images, and social media accounts.

11. A non-transitory computer-readable medium storing instructions that, when executed by one or more processors, cause the one or more processors to perform the steps of:
receiving a query requesting information regarding a place of interest;
identifying a first place which satisfies the query associated with a first database and a set of displayable content associated with the first place within a second database;
identifying a subset of the displayable content for display in response to the query, the identification of the subset of displayable content comprising determining a ranking for each item of displayable content in the set of displayable content according to the query, wherein determining the ranking for each item of displayable content in the set of displayable content comprises:
identifying particular attributes within the query,
determining, for each item of displayable content in the set of displayable content, using a machine learning classifier, one or more place attributes,
assigning, to each item of displayable content in the set of displayable content, a relevance score based on the one or more place attributes and the particular attributes, and
selecting one or more items of displayable content in the set of displayable content which are assigned the highest relevance scores to be the subset of displayable content; and
providing the subset of displayable content and the first place for presentation on a client device.

12. The non-transitory computer-readable medium of claim 11, wherein identifying the first place comprises:
identifying particular attributes within the query;
for each place in a set of places, determining one or more place attributes and assigning a relevance score based on the one or more place attributes and the particular attributes; and
selecting a place with the highest assigned relevance score as the first place.

13. The non-transitory computer-readable medium of claim 11, further comprising:
identifying one or more additional places which satisfies the query within a first database and additional sets of displayable content associated with each of the one or more additional places within a second database;
identifying additional subsets of the additional sets of displayable content for display in response to the query, the identification of the additional subsets of displayable content comprising determining a ranking for each item of displayable content in the additional sets of displayable content based on the query; and
providing the additional subset of displayable content and the one or more additional places.

14. The non-transitory computer-readable medium of claim 11, wherein the ranking for each item of displayable content in the set of displayable content is weighted according to the one or more associated place attributes.

* * * * *